United States Patent [19]

Steierman

[11] 4,065,697

[45] Dec. 27, 1977

[54] CATHODE-RAY TUBE

[75] Inventor: Bernard L. Steierman, Toledo, Ohio

[73] Assignee: Owens-Illinois, Inc., Toledo, Ohio

[21] Appl. No.: 799,902

[22] Filed: Feb. 17, 1969

[51] Int. Cl.$^2$ ............................................. H01J 31/00
[52] U.S. Cl. ................................. 313/480; 313/468; 252/478
[58] Field of Search ...................... 106/52, 53; 313/92, 313/480, 468; 252/478

[56] References Cited

U.S. PATENT DOCUMENTS

| 3,382,393 | 5/1968 | Schwartz | 313/480 |
| 3,461,078 | 8/1969 | Veres | 106/52 X |
| 3,464,932 | 9/1969 | Connelly et al. | 106/52 X |

Primary Examiner—Stephen J. Lechert, Jr.
Attorney, Agent, or Firm—Beveridge, DeGrandi, Kline & Lunsford

[57] ABSTRACT

A cathode-ray tube, such as a color television tube, formed from a glass containing up to 20 percent by weight of strontium oxide as an essential ingredient thereof, which tube has imparted thereto improved X-ray absorbing properties without any material increase in the X-ray and electron browning of the glass.

5 Claims, No Drawings

CATHODE-RAY TUBE

This invention relates to cathode-ray tubes, such as color television tubes, and more particularly to cathode-ray tubes having the physical property of absorbing X rays generated within the tubes during their operation at high voltages.

A cathode-ray tube, such as a color television tube, which is subjected to high voltages during operation emits a small amount of X rays through its face plate and even through the walls of the funnel portion. X rays are formed when a stream of very fast high-energy electrons strikes matter and is slowed down. The sudden "braking" of the electrons produces electromagnetic radiations of very short wavelength which are called X rays. Television sets have 20,000 volts or more applied across the tube during operation and these voltages are sufficiently high to result in the production of X rays within the tube whenever a portion of the stream of electrons produced by the electron gun strikes solid surfaces. The X-ray emission peak from a color television set, for example, has a wavelength of approximately 0.7A at 25,000 volts, and a wavelength of approximately 0.5A at 35,000 volts. Whenever a television service technician adjusts the control to brighten the picture on the set, he may choose to increase the voltage across the tube. This action results in geometrically increasing the intensity of X rays which are produced. It is necessary to keep any such X ray emission through the glass envelope of the cathode-ray tube at a sufficiently low level that viewers, and adjacent nonviewers as well, of the images produced on the face plate during operation of the television set are not subjected to any harmful radiation. One way in which the art has attempted to solve the problem is to form the cathode-ray tube from a glass having lead oxide as one of the essential ingredients. While the X-ray absorption properties of such glass are improved, other disadvantages have arisen, including discoloration of the glass struck by the X rays and by the stream of electrons. This problem of browning of the glass is particularly serious with respect to the face plates of color television tubes since the quality and brightness of the color of the images seen by the viewer are adversely affected. To offset this browning or discoloration, it has been necessary to incorporate cerium oxide into the PbO-containing glass composition. Another disadvantage of the use of PbO, together with its accompanying cerium oxide, is the increase in density of the glass and the resulting increase in weight of the tube. It is estimated that for every 0.01 increase in density of the glass, the weight of a 25-inch color television tube increases by 1.33 ounces.

Accordingly, it is an object of the present invention to provide a cathode-ray tube, such as a color television tube, which has an improved property of absorbing X rays formed within the tube during its operation and emitting a substantially lower and safer amount of such X rays into the viewing area of the tube.

It is another object of the present invention to form a cathode-ray tube having improved X-ray absorbing properties without increasing X-ray and electron browning of the glass and without materially altering any of the other physical properties of the glass, and which has a lower density than a corresponding tube of the prior art.

It is a further object of the present invention to provide a new and novel glass article having the property of absorbing a substantial amount of X rays which are directed thereto and transmitting only a small amount of such X rays therethrough.

In attaining the objects of this invention, one feature resides in utilizing up to about 20 percent by weight of strontium oxide as an essential component of the glass from which the glass article, such as a cathode-ray tube comprising a funnel portion and a face plate sealed thereto, is formed.

Another feature resides in utilizing up to about 10 percent by weight of yttrium oxide as an essential component of the glass from which the glass article, such as a cathode-ray tube, is to be formed.

Other objects, features, and advantages of the invention will become more apparent as the invention is discussed.

The invention is broadly concerned with the glasses presently used in the television industry for making cathode-ray tubes, which tubes usually have from about 20,000 to 40,000 volts applied across them during normal operation. Since the present invention is primarily concerned with the composition of the glass from which the face plate and funnel portions of a cathode-ray tube, such as a television tube, are to be made, it is not necessary to illustrate a conventional television tube and, accordingly, no drawing is being submitted. Included among these glasses and typical of those used by the industry are the soda-potash-barium glasses and the soda-potash-lead-barium glasses, with the preferred glasses being those coming within the following compositional range wherein the ingredients are expressed in weight percent.

TABLE I

| Ingredient | Weight Percent |
|---|---|
| $SiO_2$ | 45 – 70 |
| $Na_2O$ | 3 – 10 |
| $K_2O$ | 5 – 15 |
| $Al_2O_3$ | 0 – 6 |
| CaO | 0 – 8 |
| MgO | 0 – 3 |
| BaO | 0 – 20 |
| SrO | up to 15 |
| PbO | 0 – 30 |
| $Li_2O$ | 0 – 2 |
| $F_2$ | 0 – 2 |
| MnO | 0 – 2 |
| $TiO_2$ | 0 – 1 |
| $Sb_2O_3$ | 0 – 1 |
| $CeO_2$ | 0 – 1 |
| Rare Earths | 0 – 1 |

Other oxides can also be present in small amounts as long as they do not materially affect the basic characteristics of the glass. Alkali metal oxides such as $Rb_2O$, $Cs_2O$ may be present up to 2% by weight. Colorants such as NiO, CoO, and the like, whose sole purpose is to impart the desired shade of color to the glass, may also be present. For example, the face plate of a color television tube is usually gray and is achieved by the addition of the proper colorants. While the amount of SrO is indicated as being preferably up to 15 weight percent in the above Table, it can be present up to an amount of about 20 weight percent, but the additional SrO, while not adversely affecting the absorption properties of the glass, may affect the melting and glass-working properties, and may present problems of corrosion of the refractories. The most preferred range of SrO in the glass, however, is from about 2 to about 10% by weight of the glass.

In lieu of the strontium oxide in the above-mentioned glasses, up to 10 weight percent of yttrium oxide, and preferably up to 6 weight percent, may be present in the glass composition and the X-ray absorption of the glass is substantially improved over the commercially known television tubes.

Within this formulation, a more preferred glass composition of the invention consists essentially of the following:

TABLE I-A

| Ingredient | Weight Percent |
|---|---|
| $SiO_2$ | 50 – 70 |
| $Na_2O$ | 3 – 10 |
| $K_2O$ | 5 – 15 |
| SrO | up to 15 |
| $Al_2O_3$ | 3 – 5 |
| CaO | 1 – 5 |
| BaO | 0.1 – 20 |
| MgO | 0.1 – 3 |
| $F_2$ | 0 – 2 |
| PbO | 0.1 – 5 |

Glasses in accordance with the preferred and most preferred embodiments of the invention have a fiber softening point of from about 625° to about 700° C., an annealing point of from about 425° to about 525° C., and a density of about 2.57 – 2.8. A density of about 2.62 is preferred for the glass.

When reference is made in the specification and claims to a cathode-ray tube, such as a color television tube, it is to be understood that such a tube comprises a funnel portion, a face plate sealed to the funnel portion in any known manner, and an electron gun comprising a cathode which emits electrons. The inner surface of the face plate has a fluorescent screen formed thereon which glows under the impact of high-speed electrons. In a 25-inch color television tube the face plate has a thickness of about .430 inches, and the funnel portion is about .175 inches thick. However, the maximum or minimum thicknesses will depend to a certain extent on the composition of the glass.

While the invention will now be discussed with respect to specific examples of glass compositions, it is to be understood that these examples are merely illustrative of the invention and are not to be considered as restricting the invention in any manner.

Two glass-forming batches were made from the following ingredients in the indicated parts by weight:

TABLE II

| Ingredients | Glass A | Glass B |
|---|---|---|
| Portage Sand | 2770 | 2770 |
| Soda Ash | 523 | 523 |
| Niter | 61 | 61 |
| Calcined Potash | 393 | 393 |
| Barium Carbonate | 745 | 580 |
| Litharge | 127 | 127 |
| Montana Feldspar | 764 | 764 |
| Foote Mineral Spodumene | 146 | 146 |
| Strontium Carbonate | — | 182 |
| Sodium Silica Fluoride | 89 | 89 |
| Manganese Ore | 4.3 | 4.3 |
| Antimony Oxide | 43 | 43 |
| Powder Blue Mix | 3.2 | 3.2 |
| Green Nickel Oxide Mix | 0.9 | 0.9 |

Each batch was placed in a platinum crucible, which in turn was placed in a furnace which was at a temperature of 2750° F. After 4 hours at this temperature, the furnace was cooled to 2300° F. and the batches maintained therein for a total melting time of 5½ hours. Helical stirrers were used to stir the batches and the furnace had 0.5% excess $O_2$ therein. While strontium carbonate is preferred as the source of the strontium in the glass, strontium oxide, strontium silicate, or strontium nitrate may be used in lieu thereof.

The molten glasses were cast into plates and then cooled. Glasses A and B had the following calculated compositions expressed in weight percent and the following properties:

TABLE III

| Ingredient | Glass A | Glass B |
|---|---|---|
| $SiO_2$ | 66.3 | 66.3 |
| $Na_2O$ | 7.5 | 7.5 |
| $K_2O$ | 6.8 | 6.8 |
| $Al_2O_3$ | 3.8 | 3.8 |
| PbO | 2.5 | 2.5 |
| BaO | 11.2 | 8.7 |
| SrO | — | 2.5 |
| $F_2$ | 1.05 | 1.05 |
| $-O_2$* | −0.4 | −0.4 |
| $Li_2O$ | 0.2 | 0.2 |
| MnO | 0.06 | 0.06 |
| CaO | 0.2 | 0.2 |
| $Sb_2O_3$ | 0.8 | 0.8 |
| $Co_3O_4$ | 0.003 | 0.003 |
| NiO | 0.02 | 0.02 |
| 1. Fiber Softening Point | 650° C. | 657° C. |
| 2. Annealing Point | 448° C. | 452° C. |
| 3. Strain Point | 417° C. | 421° C. |
| 4. Density gm/cc | 2.623 | 2.629 |
| 5. Volume Resistivity (e) ohm-cm at 350° C. (expressed as logarithm of e) | 6.70 | 6.78 |

*Shows defficiency of $O_2$ in composition due to presence of $F_2$

TABLE IV

| | Glass A | Glass B |
|---|---|---|
| 1) X-Ray Transmission mR/hr (milli-roentgens per hour) | | |
| a) .150 inches thick | 56 | 26 |
| b) .175 inches thick | 20 | 8.5 |
| 2) X-Ray Discoloration - 5 minutes after exposure | | |
| a) 400 mμ | 24% | 22% |
| b) 500 mμ | 5.8% | 5.8% |
| c) 600 mμ | 2.4% | 2.8% |
| 3) Electron Browning at 400 mμ | | |
| a) 30 minutes after exposure | 21.1% | 16.3% |
| b) 24 hours after exposure | 16.8% | 14.8% |

From the above table, it is seen that the presence of 2.5% strontium oxide in Glass B in lieu of an equivalent amount of BaO has materially and unexpectedly improved the absorption properties of Glass B as compared to Glass A, and has also reduced the electron browning while not materially increasing the X-ray browning. The properties of Glass B, including the softening point temperature, annealing point, strain point, density, volume resistivity, etc., were not materially changed with respect to the corresponding properties of Glass A.

Four additional glass-forming batches were prepared having the following batch compositions wherein the ingredients are expressed in parts by weight:

TABLE V

| Ingredient | Glass C | Glass D | Glass E | Glass F |
|---|---|---|---|---|
| Portage Sand | 2400 | 2510 | 2597 | 2684 |
| Soda Ash | 362 | 432 | 484 | 484 |
| Niter | 60 | 60 | 60 | 60 |
| Potash | 536 | 536 | 588 | 670 |
| Nepheline Syenite | 720 | 720 | 720 | 720 |
| Barium Carbonate | 1175 | 780 | 385 | — |
| Fluorspar | 130 | 130 | 130 | 130 |
| Sodium Antimonate | 33 | 33 | 33 | 33 |
| Raw Dolomite Lime | 365 | 365 | 365 | 365 |
| Strontium Carbonate | — | 220 | 436 | 655 |
| Cerium Concentrate | 16 | 16 | 16 | 16 |
| $TiO_2$ (Titanox) | 25 | 25 | 25 | 25 |
| Powder Blue | 3.2 | 3.2 | 3.2 | 3.2 |
| Black Nickel Oxide | 1.1 | 1.1 | 1.1 | 1.1 |

Each of the batches was melted in a platinum crucible at a temperature of 2750° F. in a furnace having 0.5% excess oxygen and, after four hours at 2750° F., the furnace was set to cool to 2300° F. A helical stirrer was used during the melting period. After a total melting time of 5½ hours, cast plates were made from the four molten glasses.

The four glasses had the following theoretical compositions, expressed in weight percent:

TABLE VI

| Ingredient | Glass C | Glass D | Glass E | Glass F |
|---|---|---|---|---|
| $SiO_2$ | 56.5 | 58.7 | 60.4 | 62.2 |
| $Al_2O_3$ | 3.5 | 3.5 | 3.5 | 3.5 |
| $Na_2O$ | 6.3 | 7.1 | 7.7 | 7.7 |
| $K_2O$ | 8.0 | 8.0 | 8.7 | 9.8 |
| CaO | 4.1 | 4.2 | 4.2 | 4.2 |
| MgO | 1.5 | 1.5 | 1.5 | 1.5 |
| BaO | 18.0 | 12.0 | 6.0 | — |
| SrO | — | 3.0 | 6.0 | 9.0 |
| $F_2$ | 1.25 | 1.25 | 1.25 | 1.25 |
| $-O_2$ | −0.5 | −0.5 | −0.5 | −0.5 |
| $CeO_2$ | 0.2 | 0.2 | 0.2 | 0.2 |
| NiO | 0.02 | 0.02 | 0.02 | 0.02 |
| $Sb_2O_3$ | 0.5 | 0.5 | 0.5 | 0.5 |
| CoO | 0.002 | 0.001 | 0.001 | 0.001 |
| $TiO_2$ | 0.5 | 0.5 | 0.5 | 0.5 |
| Softening Point ° C. | 689 | 689 | 694 | 692 |
| Annealing Point ° C. | 508 | 506 | 504 | 509 |
| Strain Point ° C. | 466 | 465 | 463 467 | |
| Density | 2.81 | 2.74 | 2.68 | 2.62 |
| Weight of 25" Face Plate 45" thick for television tube | 23 lb, 12 oz. | 23 lb., 3 oz. | 22 lbs., 11 oz. | 22 lbs., 2 oz. |

Each of the four glasses was ground and polished and then tested for X-ray transmission by standard procedures with the following results:

TABLE VII

| | Glass C | Glass D | Glass E | Glass F |
|---|---|---|---|---|
| X-Ray Transmission at 0.75 in. thickness in mR/hr. | 12.8 | 12.9 | 14.8 | 12.1 |

The results of the X-ray transmission tests show that 1% strontium oxide in the glass has the same X-ray absorption as 2% barium oxide.

To illustrate another embodiment of the invention, two glasses were prepared from the following batch compositions wherein the ingredients are shown in parts by weight. The batches were melted in accordance with the procedure described above for Glasses C to F inclusive. The yttrium oxide replaces a portion of the $Al_2O_3$ normally used in the glass and, of course, can replace all of the $Al_2O_3$.

TABLE VIII

| Ingredients | Glass G | Glass H |
|---|---|---|
| Portage Sand | 2443 | 2343 |
| Soda Ash | 430 | 430 |
| Niter | 60 | 60 |
| Potash | 590 | 590 |
| Barium Carbonate | 873 | 873 |
| Nepheline Syenite | 726 | 726 |
| Raw Dolomite Lime | 369 | 369 |
| Yttrium Oxide* | 134 | 267 |
| Fluorspar | 135 | 135 |
| Sodium Antimonate | 33 | 33 |
| Cerium Concentrate | 16 | 16 |
| $TiO_2$ (Titanox) | 25 | 25 |
| Powder Blue | 3.2 | 3.2 |
| Black Nickel Oxide | 1.1 | 1.1 |

*The source of the yttrium oxide was an yttrium concentrate obtained from American Potash and Chemical Co. and contained 72-78 weight percent $Y_2O_3$.

Glass plates were made from the molten batches and the plates had the following theoretical compositions wherein the ingredients are expressed in weight percent:

TABLE IX

| Ingredients | Glass G | Glass H |
|---|---|---|
| $SiO_2$ | 57.4 | 55.4 |
| $Al_2O_3$ | 3.6 | 3.5 |
| BaO | 13.4 | 13.4 |
| $Na_2O$ | 7.1 | 7.1 |
| $K_2O$ | 8.7 | 8.7 |
| CaO | 4.2 | 4.2 |
| MgO | 1.6 | 1.6 |
| $Y_2O_3$ | 2.0 | 4.0 |
| $F_2$ | 1.3 | 1.3 |
| $-O_2$ | −0.6 | −0.6 |
| $TiO_2$ | 0.5 | 0.5 |
| $Sb_2O_3$ | 0.5 | 0.5 |
| $CeO_2$ | 0.2 | 0.2 |
| $Co_3O_4$ | 0.003 | 0.003 |
| NiO | 0.02 | 0.02 |
| Rare Earths | 0.03 | 0.03 |

The glasses were ground and polished and subjected to X-ray radiation. The X-ray transmission at 0.175 inch thickness in mR/hr. was 7.6 for Glass G and 2.6 for Glass H, indicating a greatly increased ability of the glass to absorb X rays which strike its surface. Thus, the presence of from about 1 to about 6 percent of yttrium oxide in the glass will materially improve the X-ray absorption properties of the glass.

From the foregoing the unexpected properties of improved X-ray absorption and decreased X-ray and electron browning of television tubes are clearly set forth. From the above disclosure, a person having ordinary skill in the art can produce glass articles, such as cathode-ray tubes, having means therein which cause X-ray radiation, which articles are capable of absorbing almost all of the emitted X rays and transmit only a minor and safe amount therethrough.

What is claimed is:

1. A cathode-ray tube comprising a glass funnel portion, glass faceplate sealed thereto, a fluorescent screen on the inner surface of said faceplate, and an electron gun disposed within said sealed tube, at least said faceplate being formed from a soda-potash-barium or a soda-potash-lead-barium glass, said glass containing cerium oxide in an amount not exceeding 1 weight percent to protect against X-ray browning and also containing as an essential ingredient up to 20 weight percent SrO, sufficient to impart improved absorption of X-radiation emitted from within the tube in the range of wavelengths between about 0.5 and 0.7A, said glass having a fiber softening point of from about 625° to about 700° C and an annealing point of from about 425° to about 525° C.

2. A cathode-ray tube of claim 1 wherein said glass contains up to 15 weight percent SrO.

3. A cathode-ray tube of claim 1 wherein said glass contains 2–10 weight percent SrO.

4. A cathode-ray tube of claim 2 wherein said glass consists essentially of the following components in addition to SrO and cerium oxide:

| Component | Weight Percent |
|---|---|
| $SiO_2$ | 50 – 70 |
| $Na_2O$ | 3 – 10 |
| $K_2O$ | 5 – 15 |
| $Al_2O_3$ | 3 – 5 |
| CaO | 1 – 5 |
| BaO | 0.1 – 20 |
| MgO | 0.1 – 3 |
| $F_2$ | 0 – 2 |
| PbO | 0.1 – 5 | and contains no more than 2 percent $Li_2O$, 2 percent MnO, 1 percent $Sb_2O_3$, 1 percent rare earths, and has a fiber softening point of from about 625° to about 700° C and an annealing point of from about 425° to about 525° C.

5. A cathode-ray tube of claim 4 wherein said glass contains 2–10 weight percent SrO.

* * * * *